US009201949B2

(12) United States Patent
Xie

(10) Patent No.: US 9,201,949 B2
(45) Date of Patent: Dec. 1, 2015

(54) INDEX SEARCHING USING A BLOOM FILTER

(71) Applicant: EMC Corporation, Hopkinton, MA (US)

(72) Inventor: Ying Xie, Cupertino, CA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 14/267,799

(22) Filed: May 1, 2014

(65) Prior Publication Data

US 2014/0324880 A1 Oct. 30, 2014

Related U.S. Application Data

(63) Continuation of application No. 13/762,650, filed on Feb. 8, 2013, now Pat. No. 8,756,238, which is a continuation of application No. 12/661,142, filed on Mar. 10, 2010, now Pat. No. 8,396,873.

(51) Int. Cl.
*G06F 17/30* (2006.01)

(52) U.S. Cl.
CPC .... *G06F 17/30631* (2013.01); *G06F 17/30312* (2013.01)

(58) Field of Classification Search
CPC .................. G06F 17/30631; G06F 17/30312
See application file for complete search history.

(56) References Cited

U.S. PATENT DOCUMENTS

| 7,065,619 | B1 | 6/2006 | Zhu | |
|---|---|---|---|---|
| 7,434,015 | B2 * | 10/2008 | Zhu et al. | 711/162 |
| 7,454,443 | B2 * | 11/2008 | Ram et al. | |
| 7,620,766 | B1 * | 11/2009 | Waldspurger | 711/6 |
| 7,716,180 | B2 * | 5/2010 | Vermeulen et al. | 707/626 |
| 7,725,437 | B2 * | 5/2010 | Kirshenbaum et al. | 707/640 |
| 7,730,058 | B2 * | 6/2010 | Sareen et al. | 707/721 |
| 7,743,013 | B2 * | 6/2010 | Mityagin et al. | |
| 7,849,063 | B2 * | 12/2010 | Stata et al. | 707/696 |
| 8,290,972 | B1 * | 10/2012 | Deshmukh et al. | 707/758 |
| 8,396,873 | B2 * | 3/2013 | Xie | 707/741 |
| 2005/0044108 | A1 * | 2/2005 | Shah et al. | 707/104.1 |
| 2007/0168516 | A1 * | 7/2007 | Liu et al. | 709/226 |
| 2009/0182726 | A1 * | 7/2009 | Wang | 707/5 |
| 2009/0187546 | A1 * | 7/2009 | Hamilton Whyte | 707/3 |

FOREIGN PATENT DOCUMENTS

| CN | 101359325 A | 2/2009 |
|---|---|---|
| CN | 101398820 A | 4/2009 |

OTHER PUBLICATIONS

Benjamin Zhu et al: "Avoiding the Disk Bottleneck in the Data Domain Deduplication File System", Proceedings of the 6th USENIX Conference on File and Storage Technologies (FAST'08), Feb. 29, 2008, pp. 269-282, XP05511 0329.

* cited by examiner

*Primary Examiner* — Leslie Wong
(74) *Attorney, Agent, or Firm* — Van Pelt, Yi & James LLP

(57) ABSTRACT

A system for index searching comprises a first index, a second index, a processor, and a memory. The processor is configured to determine, using a Bloom filter for the second index of fingerprints, whether the Bloom filter indicates that an entry corresponding to a segment has been previously stored in the second index. The processor is further configured to, in the event that the Bloom filter indicates that an entry corresponding to the segment has been previously stored in the second index, retrieve a second index entry associated with the segment that has been previously stored. The memory is coupled to the processor and configured to provide the processor with instructions.

20 Claims, 8 Drawing Sheets

INDEX SEARCHING USING A BLOOM FILTER

CROSS REFERENCE TO OTHER APPLICATIONS

This application is a continuation of U.S. patent application Ser. No. 13/762,650, now U.S. Pat. No. 8,756,238, entitled INDEX SEARCHING USING A BLOOM FILTER filed Feb. 8, 2013 which is incorporated herein by reference for all purposes, which is a continuation of U.S. patent application Ser. No. 12/661,142, now U.S. Pat. No. 8,396,873, entitled INDEX SEARCHING USING A BLOOM FILTER filed Mar. 10, 2010 which is incorporated herein by reference for all purposes.

BACKGROUND OF THE INVENTION

For systems that store information using segments that are deduplicated, an index is used to identified whether the segment has been previously stored and where a given segment is stored. However, as the storage systems increase in the number of segments that are stored, the index also increases in size, and it becomes more and more time consuming to locate a received segment's entry or not in the index.

BRIEF DESCRIPTION OF THE DRAWINGS

Various embodiments of the invention are disclosed in the following detailed description and the accompanying drawings.

DETAILED DESCRIPTION

Figure 1:
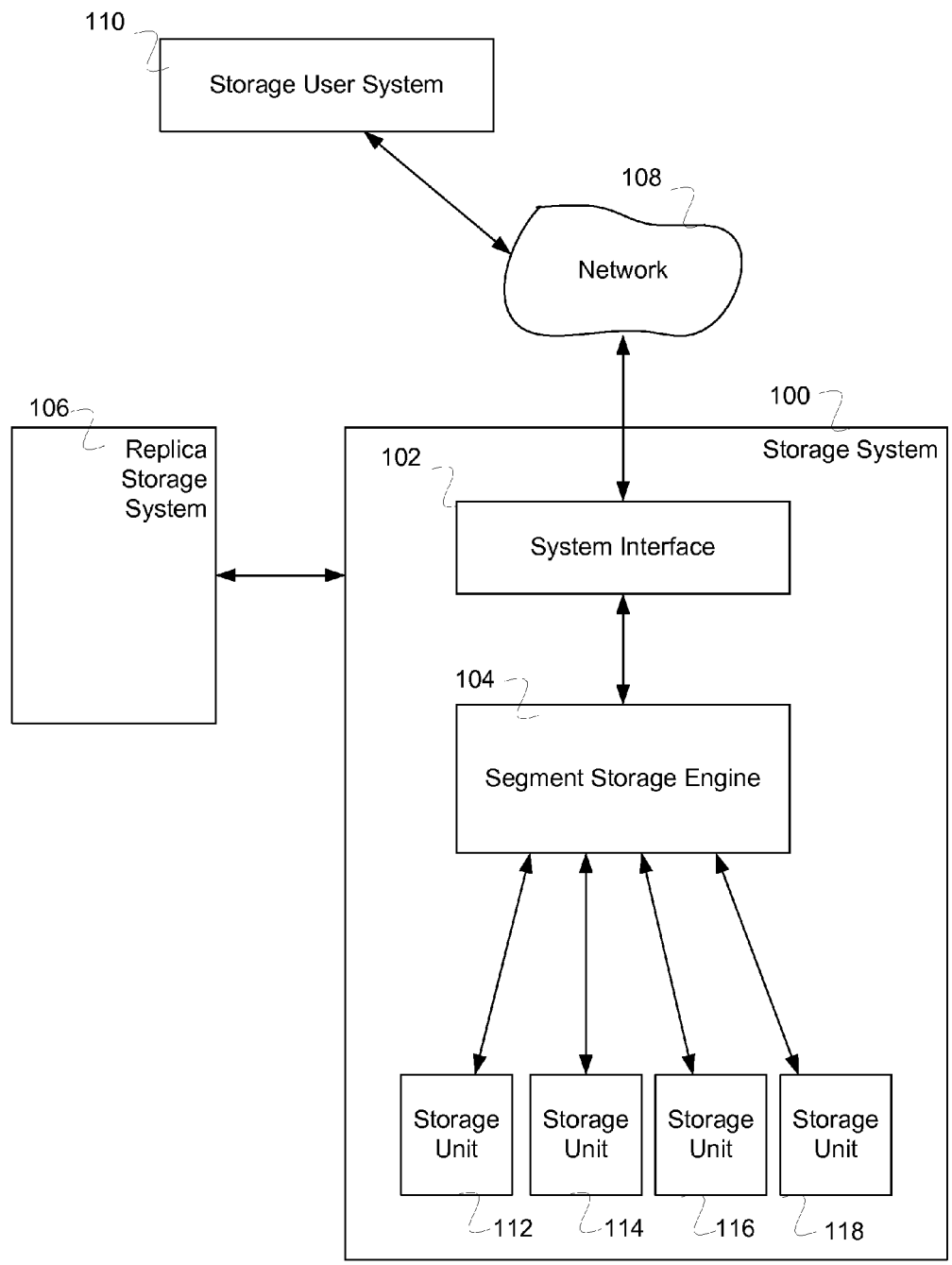
FIG. 1 is a block diagram illustrating an embodiment of a system for storage for data.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for index searching is disclosed. The system comprises a first index, a second index, a Bloom filter, a processor, and a memory. The processor is configured to: 1) receive a request to retrieve a segment; 2) determine, using a Bloom filter for the second index of fingerprints, whether the Bloom filter indicates that an entry corresponding to the segment has been previously stored in the second index; 3) in the event that the Bloom filter indicates that an entry corresponding to the segment has been previously stored in the second index, retrieving a second index entry associated with the segment that has been previously stored; 4) in the event that the an entry corresponding to the segment is not found in the second index, checking the first index to determine whether an entry corresponding to the segment has been previously stored in the first index; 5) in the event that the first index indicates that an entry corresponding to the segment has been previously stored in the first index, retrieving a first index entry associated with the segment that has been previously stored; and 6) a memory coupled to the processor and configured to provide the processor with instructions.

The Bloom filter is used to identify whether the second index includes an entry associated with a candidate segment. The use of the Bloom filter leads to reducing random access of the second index. In some embodiments, a fingerprint is calculated for the candidate segment. The fingerprint is entered into a first index (e.g., an index referred to as L0). The first index is in a sorted order. In some embodiments, a portion of the fingerprint (e.g., the first two bytes) is used to point to a header which identifies a location within the first index near where the fingerprint is or is not stored. Since the first index is a sorted list and new segment fingerprints are constantly being added, a second index (e.g., an index referred to as L1) is used to store fingerprints for new segments. In various embodiments, the second index is sorted, is partially sorted, is not sorted, is smaller than the first index, is one of a plurality of secondary indices, or has any other appropriate characteristic. The second index, when a criteria is fulfilled (e.g., the second index has reached a certain size), is merged with the first index and sorted to make a new first index. In some embodiments, during the merge of the second index into the first index, a temporary or alternate second index is used. In some embodiments, in addition to the second index, there is a memory buffer that holds index entries before entry into the second index, and when looking for a segment in the 'index', the system looks at: the memory buffer; the Bloom filter for the second index and if the Bloom filter indicates it is required, the second index; and the first index. In some embodiments, there are a plurality of secondary indices each with Bloom filters, and when looking for a segment in the 'index', the system looks at each Bloom filter for a secondary index, and if the Bloom filter indicates that it is necessary, the second index, and the first index. Since the system, when looking at the index, which comprises multiple parts (e.g., a memory buffer, one or more secondary indices, a first index, etc.), stops looking for the segment entry once it has found the most recent entry in the index. In some embodiments, the search within the parts of the index is performed in the order of newest index to oldest index—for example, first the small memory buffer, next the Bloom filter for a second index and if required, the second index, and last the first index.

FIG. 1 is a block diagram illustrating an embodiment of a system for storage for data. In the example shown, storage system 100 is accessed by a user using storage user system 110 or by storage user system 110 via network 108. In various embodiments, network 108 comprises one or more of a wired network, a wireless network, a local area network, a wide area network, the Internet, or any other appropriate network. Storage system 100 comprises system interface 102, segment storage engine 104, and a plurality of storage units (represented in FIG. 1 by storage unit 112, storage unit 114, storage unit 116, and storage unit 118). Storage system 100 is replicated using replica storage system 106. For example, a storage unit is replicated by storing segments and metadata stored on the storage unit to another storage unit.

Storage user system 110 breaks a file, a data stream, or a data block into segment(s) (e.g., boundaries are identified for one or more segments—for example, a hash function operates on a portion of the content of the file; when the hash function is equal to a value, is a minimum value, is a maximum value, is between a minimum and maximum length, and/or is an extremum value within a window of the file, etc. a segment boundary is determined). Segment boundaries are determined such that two similar files, data streams, or data blocks have the goal of having the same segments for identical portions of the files, data streams, or data blocks, and different segments for the non-identical portions of the files, data streams, or data blocks. In various embodiments, the segment determination is based on the content of the data (e.g., using value(s) calculated based on data content), not based on the content (e.g., byte count, file criteria, etc.), or a combination of content-based criteria and non-content-based criteria. In various embodiments, storage user system 110 encrypts and/or compresses the segments. Storage user system 110 sends the segment(s) to be stored by storage system 100 via network 108. In various embodiments, information regarding how to reconstruct the file, the data stream, or the data block is also sent from storage user system 110 to storage system 100 and/or is stored by storage system 100, or any other appropriate action for the information.

Storage system 100 receives the segment using system interface 102. Segment storage engine 104 stores the segments in a storage unit or stores a reference to a previously stored identical segment in a storage unit (e.g., storage unit 112, storage unit 114, storage unit 116, or storage unit 118). In various embodiments, a storage unit comprises a deduplicating storage system, a storage device, multiple storage devices, a portion of a storage device, a hard drive, an array of drives, a semiconductor memory, or any other appropriate components for a node.

Segment storage engine 104 only stores a segment in the event that the segment has not been previously stored in one of the storage units. In some embodiments, an identifier (e.g., a digital fingerprint, Secure Hash Algorithm hash value, etc.) is used for determining whether a segment has been previously stored by seeing whether an identical identifier already exists in an index of stored segments for storage system 100. In various embodiments, the identifier for a given segment is determined using storage system 100, using storage user system 110, or any other appropriate system. In some embodiments, an identifier is sent along with an associated segment from storage user system 110 to storage system 100.

Storage user system 110 requests one or more segments that is/are stored on storage system 100 via network 108. Storage system 100 receives the request using system interface 102. Segment storage engine 104 routes request to locate or locates the segments used to store a file, data stream, or data block in the appropriate storage unit(s).

In some embodiments, the one or more segments are sent to storage user system 110 via network 108, and storage user system 110 uses the one or more segments to reconstruct a file, data stream, or data block. In various embodiments, the segment(s) are decrypted and/or decompressed or any other appropriate processing in order to reconstruct the desired file, data stream, or data block.

In some embodiments, the storage user system 110 requests the data by identifying the file name and offset within the file. The data is sent to storage user system 110 via network 108 after storage system 100 uses the one or more segments to reconstruct a file, data stream, or data block.

In some embodiments, the functionality split between storage user system 110 and storage system 100 is different: segmentation and storage are both performed by storage system 100. In some embodiments, there are one or more storage user systems feeding segments or data streams to one or more storage systems (e.g., one to many, many to many, shared configuration, or exclusive configuration.

In some embodiments, storage system 100 comprises a processor and a memory. In various embodiments, the processor for storage system 100 comprises a single processor, multiple processors, one or more processors with virtual system(s), or any other appropriate hardware or software to enable storing data on a system.

Figure 2:
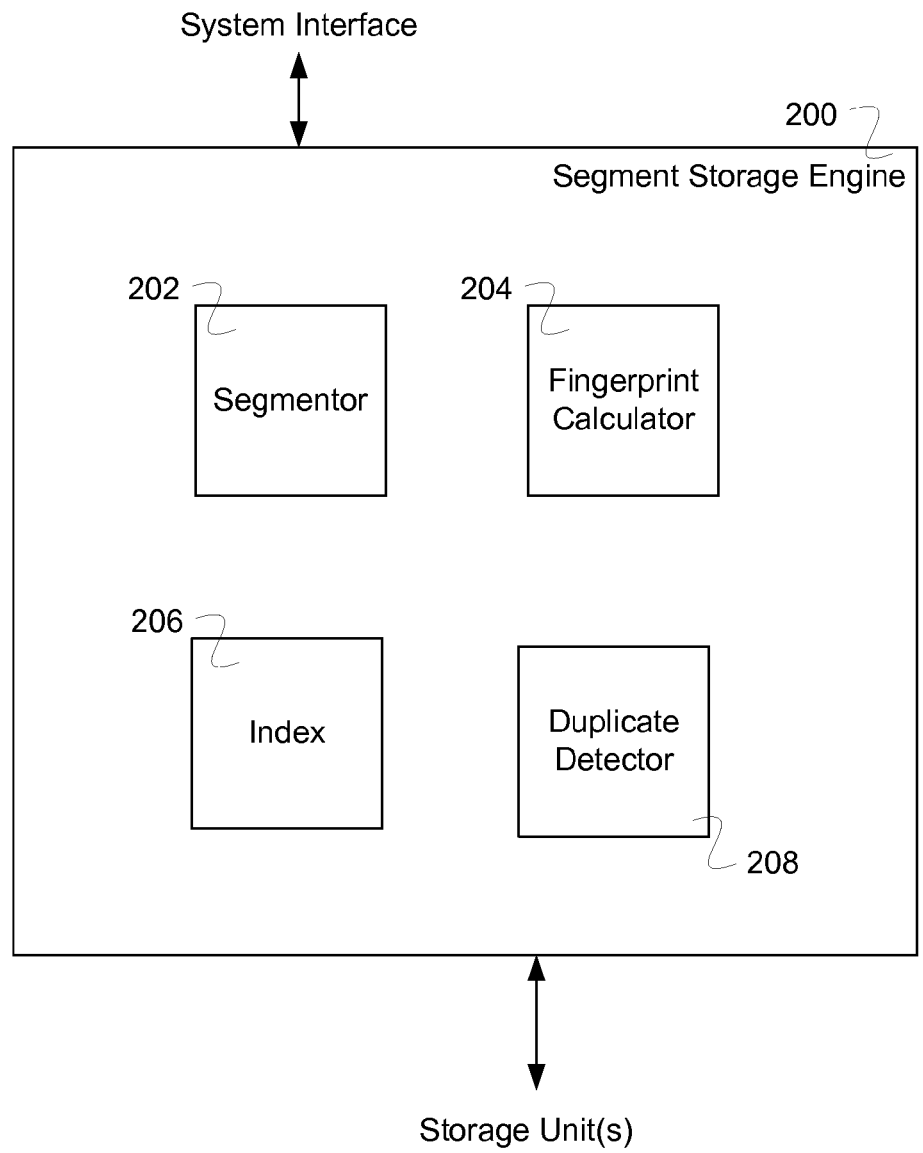
FIG. 2 is a block diagram illustrating an embodiment of a segment storage engine.

FIG. 2 is a block diagram illustrating an embodiment of a segment storage engine. In some embodiments, segment storage engine 200 of FIG. 2 is used to implement segment storage engine 104 of FIG. 1. In the example shown, segment storage engine 200 comprises segmentor 202, fingerprint calculator 204, index 206, and duplicate detector 208. In some embodiments, segment storage engine 200 receives segments and not data files, streams, or blocks in which case the segmentor 202 is not used and/or not included in segment storage engine 208. Segmentor 202 breaks a file, a data stream, or a data block into segment(s) (e.g., boundaries are identified for one or more segments—for example, a hash function operates on a portion of the content of the file; when the hash function is equal to a value, is a minimum value, is a maximum value, is between a minimum and maximum length, and/or is an extremum value within a window of the file, etc. a segment boundary is determined). Segment boundaries are determined such that two similar files, data streams, or data blocks have the goal of having the same segments for identical portions of the files, data streams, or data blocks, and different segments for the non-identical portions of the files, data streams, or data blocks. In various embodiments, the segment determination is based on the content of the data (e.g., using value(s) calculated based on data content), not based on the content (e.g., byte count, file criteria, etc.), or a combination of content-based criteria and non-content-based criteria. Fingerprint calculator 204 calculates an identifier for a segment—for example, a Rabin fingerprint, a Message-Digest algorithm 5 (MD5) or Secure Hash Algorithm (SHA) cryptographic hash, etc. Duplicate detector 208 uses the fingerprint calculated for a segment and index 206 to determine whether the segment has been previously stored by seeing if the fingerprint is currently in index 206. In the event that the fingerprint is not in index 206, a new entry is made that includes the fingerprint and the segment is stored in the storage units for the system. Index 206 also includes information indicating where the segment is stored within the storage units. In some embodiments, index 206 comprises one or more index structures—for example, a memory buffer, a large sorted index, or a small index (sorted or unsorted).

Figure 3:
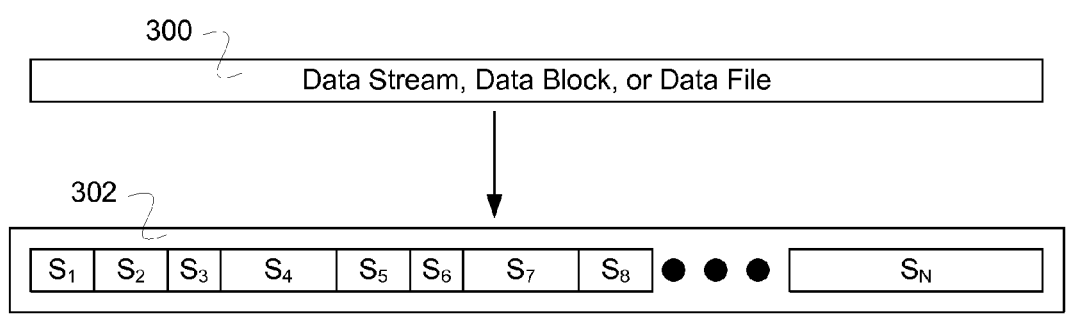
FIG. 3 is a block diagram illustrating an embodiment of input stream, segment, and super segment data configurations.

FIG. 3 is a block diagram illustrating an embodiment of input stream, segment, and super segment data configurations. In the example shown, data stream, data block, or data file 300 is input to a data storage system which breaks up the input into segments 302 (e.g., $S_1$, $S_2$, $S_3$, $S_4$, $S_5$, $S_6$, $S_7$, $S_8$, and $S_N$). In various embodiments, segments 302 have a minimum length, a maximum length, have average size of about 8 KB, or have any other appropriate property. In various embodiments, segments are generated by identifying segment endpoints using a content based algorithm (e.g., in a window of data a hash function on the window is equal to a number, is a minimum/maximum/extremum value for all windows, has a pattern of 1's or 0's in predetermined bit locations, etc.), using a non-content based algorithm (e.g., has a predetermined length, has a minimum length, a maximum length, associated with a file length, etc.), or a combination of the content based and non-content based algorithms, or any other appropriate manner of determining segment endpoints.

Figure 4:
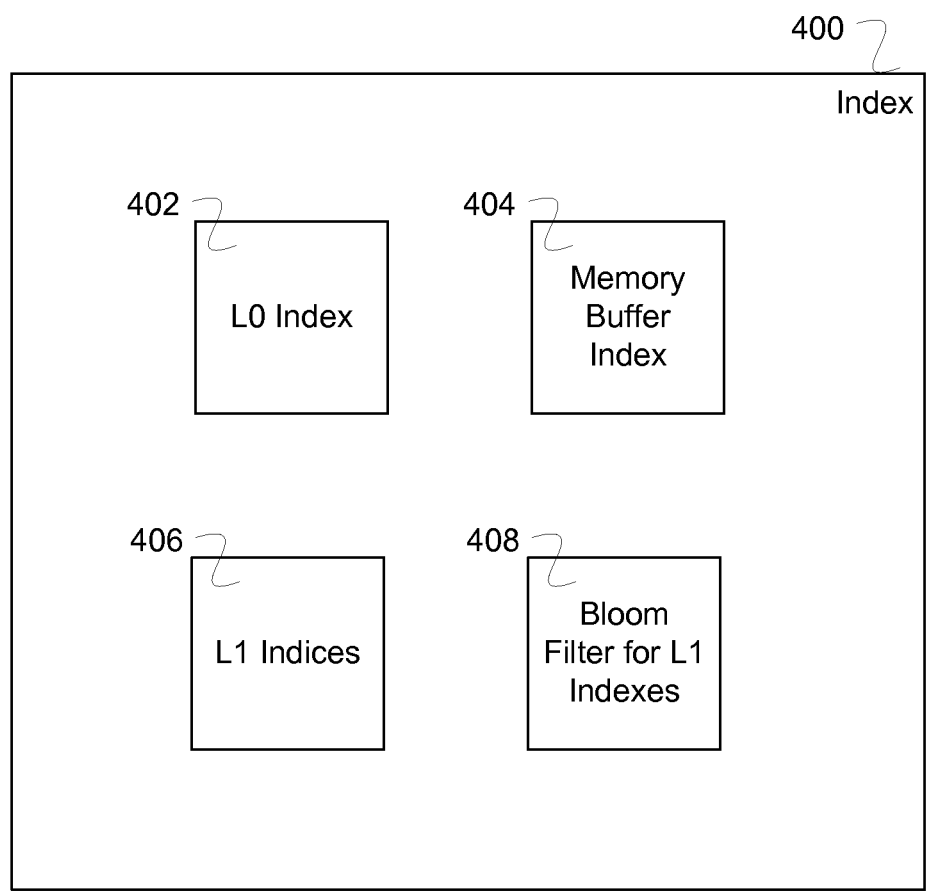
FIG. 4 is a block diagram illustrating an embodiment of an index.

FIG. 4 is a block diagram illustrating an embodiment of an index. In some embodiments, index 400 of FIG. 4 is used to implement index 206 of FIG. 2. In the example shown, index 400 comprises a multi-level index, which has several stages or levels in which index entries are stored and/or searched to find an index entry. In some embodiments, the index entry comprises an identifier (e.g., a fingerprint) and a location (e.g., a container, a disk location, etc.). The index comprises L0 index 402, memory buffer index 404, L1 indices 406, and Bloom filter for L1 indices 408. In the event that a new segment is identified that is to be stored in the segment storage system. An index entry is stored for the new segment. The index entry is stored first in memory buffer index 404, which is not a sorted index. Index entries in memory buffer index 404 are periodically transferred to an L1 index (e.g., an index of L1 indices 406). The L1 index comprises a sorted index. Index entries in and L1 index of L1 indices 406 are periodically merge-sorted with L0 index 402. In some embodiments, memory buffer index 404 is larger than an L1 index of L1 indices 406, which in turn is larger than L0 index 402. In some embodiments, memory buffer index 404 is a few gigabytes in size (e.g., 2 GB), an L1 index of L1 indices 406 is one or more tens of gigabytes in size (e.g., 10 GB), and L0 index 402 is one or more hundreds of gigabytes in (e.g., 100 GB). In some embodiments, a portion of the identifier is used to lookup a location for an index entry within an index (e.g., the first two bytes of a fingerprint is used to look up in a table where in the index to start to look for the index entry associated with the fingerprint).

Figure 5:
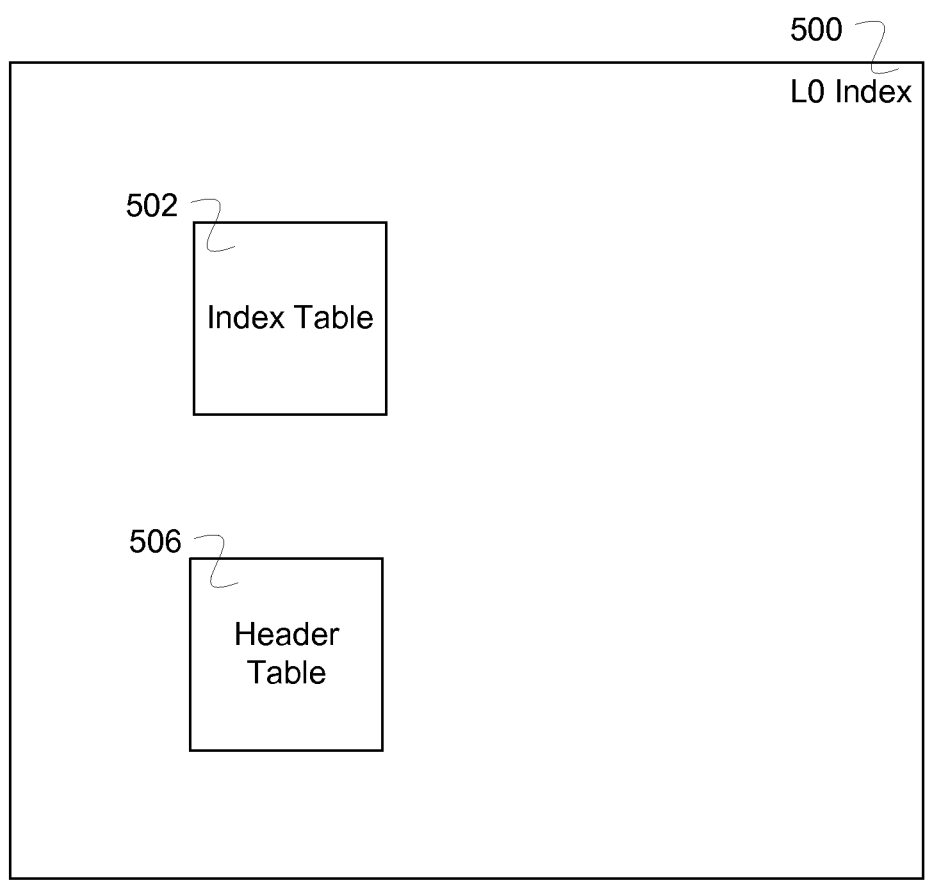
FIG. 5 is a block diagram illustrating an embodiment of a L0 index.

FIG. 5 is a block diagram illustrating an embodiment of a L0 index. In some embodiments, L0 index 500 is used to implement L0 index 402 of FIG. 4. In the example shown, L0 index 500 comprises index table 502 and header table 506. Index table 502 comprises a list of identifiers for segments stored and a location and/or a container or area/zone/bucket where the segments are stored. Header table 506 comprises a table that is used to locate an index entry within L0 index 500 using a portion of the identifier to look up in header table 506 an area within L0 index 500 in which the index entry is located (e.g., a bucket within the index).

Figure 6:
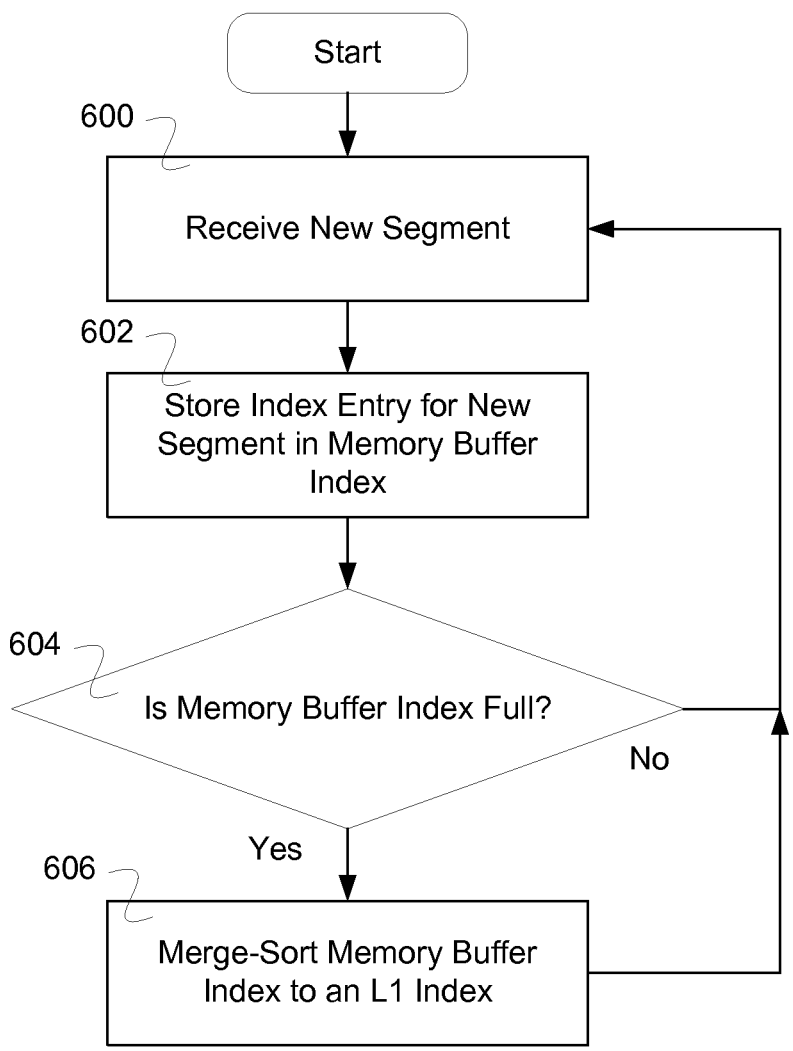
FIG. 6 is a flow diagram illustrating an embodiment of a process for storing an entry in an index.

FIG. 6 is a flow diagram illustrating an embodiment of a process for storing an entry in an index. In the example shown, in 600 a new segment is received. In 602, an index entry for the new segment is stored in the memory buffer index. In 604, it is determined whether the memory buffer index is full. In some embodiments, another criterion is used to determine whether to merge sort or transfer the index entries of memory buffer index to an L1 index. In the event that it is determine that the memory buffer index is full, then in 606 the index entries in memory buffer index are merge sorted to an L1 index; and control passes to 600. In the event that it is determined that memory buffer index is not full, then control passes to 600. In some embodiments, the index entries are transferred to an L1 index not merge sorted.

Figure 7:
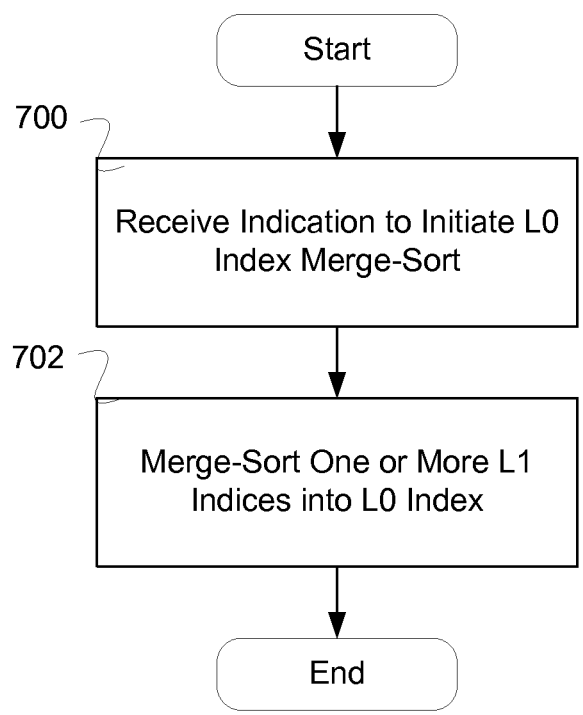
FIG. 7 is a flow diagram illustrating an embodiment of a process for storing an entry in an index.

FIG. 7 is a flow diagram illustrating an embodiment of a process for storing an entry in an index. In the example shown, in 700 an indication is received to initiate an L0 merge sort. In various embodiments, the indication is determined based on whether an L1 index is full, an L1 index reaches a predetermined size, buckets in an L1 index have a predetermined number of entries, or any other appropriate criteria. In 702, one or more L1 indexes are merge sorted into the L0 index. In some embodiments, there is only one L1 index. In some embodiments, during a merge sort of the entries in one L1 index into the L0 index, a temporary L1 index is used for storing index entries for new segments during the merge-sort operation. In some embodiments, a merge sort from an L1 index to the L0 index is performed one bucket at a time, where the entries in an L1 index bucket and the entries in an L0 index bucket correspond to identifiers with similar characteristics (e.g., the same first two bytes). In various embodiments, an L1 index is not ordered, contains duplicates, has duplicates with other L1 indices, or any other appropriate properties.

Figure 8:
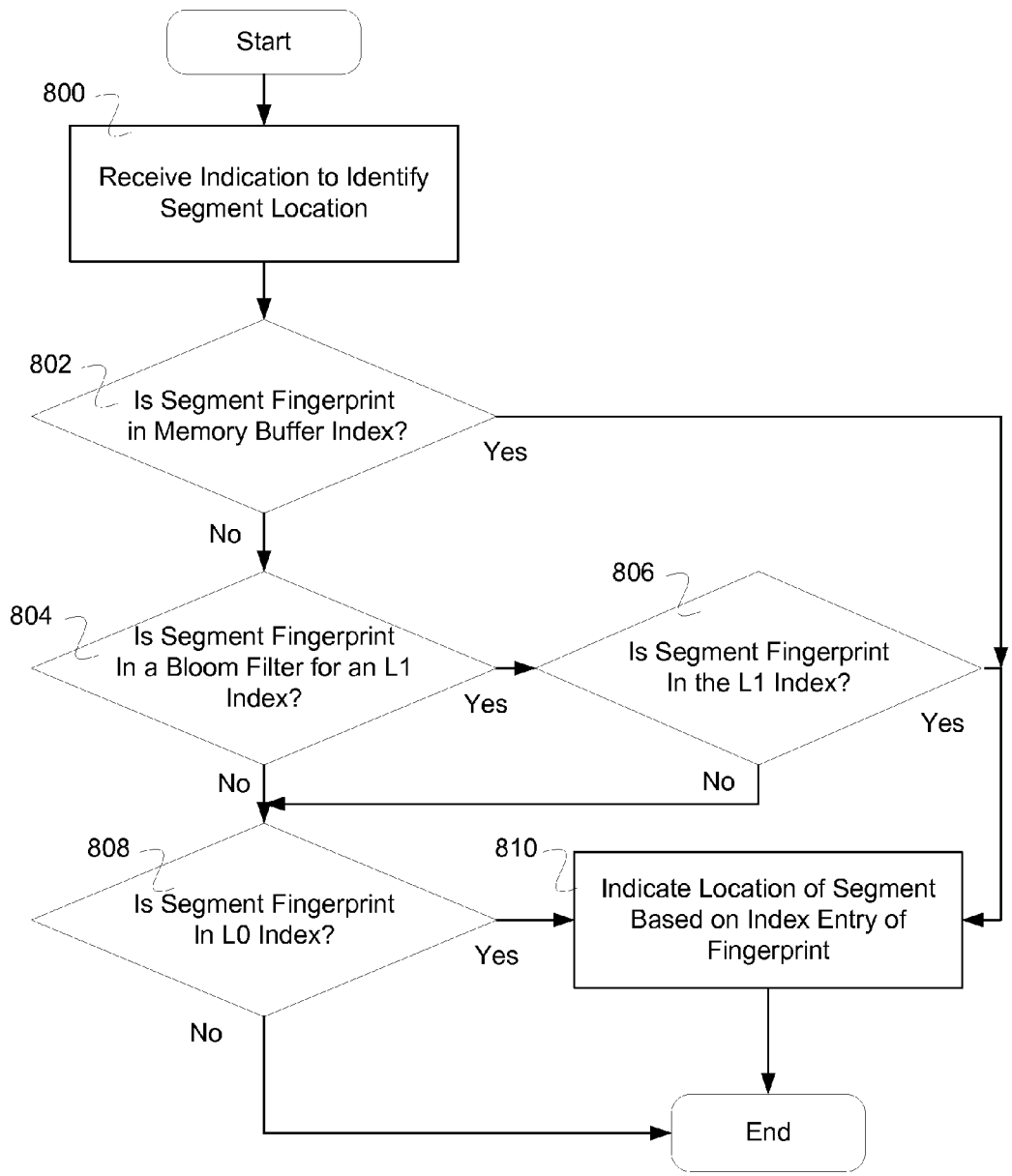
FIG. 8 is a flow diagram illustrating a process for locating an index entry.

FIG. 8 is a flow diagram illustrating a process for locating an index entry. In the example shown, in 800 an indication is received to identify a segment location. In 802, it is determined whether the segment fingerprint is in the memory buffer index. In the event that the segment fingerprint is in the memory buffer index, control passes to 810. In the event that the segment fingerprint is not in the memory buffer index, in 804 it is determined whether the segment fingerprint is in a Bloom filter for an L1 index. The Bloom filter provides an improvement in efficiency for the system in that time to look in one or more L1 indices are mostly removed or reduced by using the Bloom filter to determine whether to search in one or more L1 indices. In the event that the segment fingerprint is in the Bloom filter for an L1 index, then in 806 it is determined whether the segment fingerprint is in the L1 index. In various embodiments, there is one L1 index, there is more than one L1 index and each L1 index has a corresponding Bloom filter, or any other appropriate arrangement for Bloom filters and L1 indices. In the event that the segment fingerprint is not in the Bloom filter for an L1 index, or in the event that the segment fingerprint is not found in the L1 index, then in 808 it is determined whether the segment fingerprint is in the L0 index. In the event that the segment fingerprint is not in the L0 index, then the process ends. In the event that the segment fingerprint is in the memory merge buffer, the L1 index, or the L0 index, then in 810 the location of the segment is indicated based on an index entry of the fingerprint.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for index searching, comprising:
   a first index of fingerprints, wherein the first index of fingerprints is sorted;
   one or more secondary indices of fingerprints;
   a processor configured to:
     determine whether an entry corresponding to a segment is indicated to have been previously stored in the one or more secondary indices of fingerprints using a corresponding Bloom filter;
     in the event that the entry corresponding to the segment is indicated to have been previously stored in the one or more secondary indices by the corresponding Bloom filter, determine, using the one or more secondary indices, whether a second entry corresponding to the segment has been previously stored in the one or more secondary indices; and
     in the event that the entry corresponding to the segment is not indicated to have been previously stored in the one or more secondary indices, determine whether an entry corresponding to a segment has been previously stored in the first index.

2. The system as in claim 1, wherein the processor is further configured to receive a request to retrieve the segment.

3. The system as in claim 1, wherein the processor is further configured to, in the event that the first index indicates that an entry corresponding to the segment has been previously stored in the first index, retrieve a first index entry associated with the segment that has been previously stored.

4. The system as in claim 1, wherein an index of the one or more secondary indices is merge sorted into the first index.

5. The system as in claim 1, wherein an index of the one or more secondary indices is smaller in size that the first index.

6. The system as in claim 1, wherein an index of the one or more secondary indices receives a latest new entry.

7. The system as in claim 1, wherein an index of the one or more secondary indices is sorted.

8. The system as in claim 1, wherein an index of the one or more secondary indices is not sorted.

9. The system as in claim 1, wherein an index of the one or more secondary indices is partially sorted.

10. The system as in claim 1, wherein an index of the one or more secondary indices is merge sorted into the first index when a criteria is fulfilled.

11. The system as in claim 10, wherein the criteria comprises the index reaching a predetermined size.

12. The system as in claim 1, further comprising a memory buffer that holds entries before entry into an index of the one or more secondary indices.

13. The system as in claim 12, wherein the memory buffer index includes a fingerprint associated with a stored segment.

14. The system as in claim 12, wherein the memory buffer index is transferred or merge sorted into an index of the one or more secondary indices.

15. The system as in claim 12, wherein the memory buffer is checked to determine whether the entry corresponding to the segment has been stored in the memory buffer before determining whether the entry corresponding to the segment has been stored in the one or more secondary indices.

16. A method for index searching, comprising:
    determining, using a processor, whether an entry corresponding to a segment is indicated to have been previously stored in one or more secondary indices using a corresponding Bloom filter, wherein the one or more secondary indices comprises fingerprints;
    in the event that the entry corresponding to the segment is indicated to have been previously stored in the one or more secondary indices by the corresponding Bloom filter, determining, using the one or more secondary indices, whether a second entry corresponding to the segment has been previously stored in the one or more secondary indices; and
    in the event that the entry corresponding to the segment is not indicated to have been previously stored in the one or more secondary indices, determining whether an entry corresponding to a segment has been previously stored in the first index.

17. The method as in claim 16, wherein an index of the one or more secondary indices is merge sorted into the first index.

18. The method as in claim 17, wherein an index of the one or more secondary indices is merge sorted into the first index when a criteria is fulfilled.

19. The method as in claim 18, wherein the criteria comprises the index reaching a predetermined size.

20. A computer program product for index searching, the computer program product being embodied in a non-transitory computer readable storage medium and comprising computer instructions for:
    determining whether an entry corresponding to a segment is indicated to have been previously stored in one or more secondary indices using a corresponding Bloom filter, wherein the one or more secondary indices comprises fingerprints;
    in the event that the entry corresponding to the segment is indicated to have been previously stored in the one or more secondary indices by the corresponding Bloom filter, determining, using the one or more secondary indices, whether a second entry corresponding to the segment has been previously stored in the one or more secondary indices; and
    in the event that the entry corresponding to the segment is not indicated to have been previously stored in the one or more secondary indices, determining, whether an entry corresponding to a segment has been previously stored in the first index.

* * * * *